United States Patent
Neil et al.

(10) Patent No.: US 7,689,012 B2
(45) Date of Patent: Mar. 30, 2010

(54) FINGER SENSOR WITH DATA THROTTLING AND ASSOCIATED METHODS

(75) Inventors: James Warren Neil, Melbourne, FL (US); Joseph Andrew Tykowski, Oviedo, FL (US); Steven Eugene Milburn, Palm Bay, FL (US)

(73) Assignee: Authentec, Inc., Melbourne, FL (US)

(*) Notice: Subject to any disclaimer, the term of this patent is extended or adjusted under 35 U.S.C. 154(b) by 1203 days.

(21) Appl. No.: 11/249,584

(22) Filed: Oct. 13, 2005

(65) Prior Publication Data
US 2006/0093191 A1 May 4, 2006

Related U.S. Application Data

(60) Provisional application No. 60/618,399, filed on Oct. 13, 2004, provisional application No. 60/618,401, filed on Oct. 13, 2004.

(51) Int. Cl.
*G06K 9/00* (2006.01)
(52) U.S. Cl. .................. 382/124; 382/115; 382/125; 382/126; 382/276
(58) Field of Classification Search ................ 382/124, 382/276, 115, 125, 126
See application file for complete search history.

(56) References Cited

U.S. PATENT DOCUMENTS

| | | | | |
|---|---|---|---|---|
| 4,933,976 A | | 6/1990 | Fishbine et al. ............. 382/4 |
| 5,963,679 A | | 10/1999 | Setlak .................. 382/312 |
| 6,002,815 A | | 12/1999 | Immega et al. ............ 382/312 |
| 6,088,585 A | * | 7/2000 | Schmitt et al. ............ 455/411 |
| 6,134,340 A | * | 10/2000 | Hsu et al. ................ 382/124 |
| 6,241,288 B1 | * | 6/2001 | Bergenek et al. ............ 283/67 |
| 6,289,114 B1 | | 9/2001 | Mainguet ................ 382/124 |
| 6,333,989 B1 | | 12/2001 | Borza ................... 382/124 |
| 6,459,804 B2 | | 10/2002 | Mainguet ................ 382/124 |
| 6,483,932 B1 | | 11/2002 | Martinez et al. ............ 382/124 |
| 7,031,501 B2 | * | 4/2006 | Adachi et al. ............. 382/124 |
| 7,197,168 B2 | * | 3/2007 | Russo .................. 382/125 |

(Continued)

OTHER PUBLICATIONS

"MBF200 Solid-State Fingerprint Sensor", Fujitsu Microelectronics America, Inc., 2003, available at www.fma.fulitsu.com.

*Primary Examiner*—Aaron W Carter
*Assistant Examiner*—Stephen R Koziol
(74) *Attorney, Agent, or Firm*—Allen, Dyer, Doppelt, Milbrath & Gilchrist, P.A.

(57) ABSTRACT

A finger sensing device may include a finger sensing area to receive a user's finger moved in a sliding motion, a sensor controller cooperating with the finger sensing area for collecting image data therefrom, an image processor, and a communications path for sending image data from the sensor controller to the image processor. The sensing device may use at least one of the sensor controller and the image processor for (i) selecting a reference image data subset based upon reference image data, (ii) selecting a new image data subset, and (iii) comparing the new image data subset to the reference image data subset to develop a matching score, and, if the matching score is above a matching threshold, then not having new image data corresponding to the new image data subset sent over the data communications path, and, if the matching score is below the matching threshold, then having the new image data corresponding to the new image data subset sent over the data communications path. The finger sensing device may be operable at a dynamic scan rate.

53 Claims, 7 Drawing Sheets

U.S. PATENT DOCUMENTS

| | | | |
|---|---|---|---|
| 2001/0005221 A1 | 6/2001 | Huang | 348/222 |
| 2001/0017934 A1 | 8/2001 | Paloniemi et al. | 382/107 |
| 2002/0012455 A1 | 1/2002 | Benckert | 382/124 |
| 2002/0028004 A1* | 3/2002 | Miura et al. | 382/124 |
| 2003/0002718 A1 | 1/2003 | Hamid | 382/124 |
| 2003/0091219 A1 | 5/2003 | Martinez et al. | 382/124 |
| 2003/0123714 A1 | 7/2003 | O'Gorman et al. | 382/124 |
| 2003/0126448 A1* | 7/2003 | Russo | 713/186 |
| 2003/0156744 A1 | 8/2003 | Hashimoto | 382/124 |
| 2003/0194114 A1 | 10/2003 | Mitsuyu et al. | 382/124 |
| 2004/0052407 A1 | 3/2004 | Kawabe | 382/124 |
| 2004/0208348 A1 | 10/2004 | Baharav et al. | 382/124 |
| 2005/0012714 A1 | 1/2005 | Russo et al. | 345/157 |
| 2005/0078855 A1 | 4/2005 | Chandler et al. | 382/116 |
| 2005/0089203 A1 | 4/2005 | Setlak | 382/124 |
| 2005/0179657 A1 | 8/2005 | Russo et al. | 345/163 |

\* cited by examiner

REFERENCE IMAGE
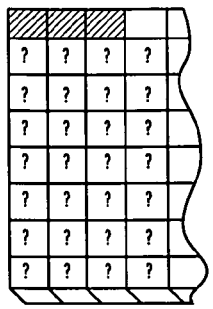 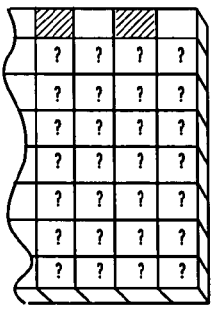
FIG. 3A
MULTI-PIXEL MOTION
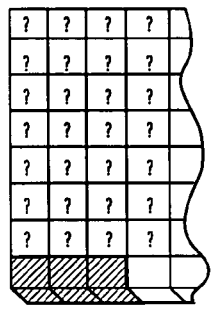 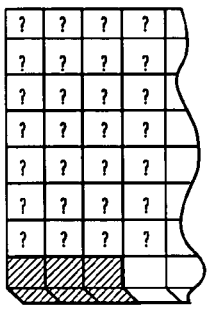
FIG. 3b
SINGLE PIXEL MOTION
REFERENCE IMAGE
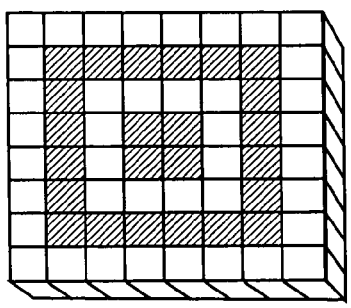
FIG. 4A
X ONLY MOTION
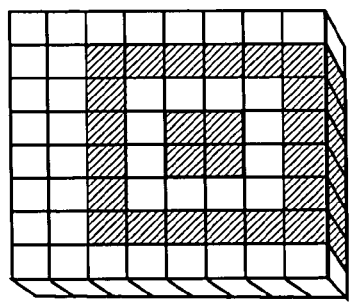
FIG. 4B
Y ONLY MOTION
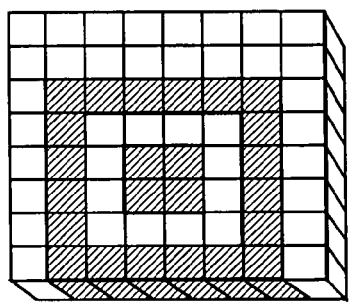
FIG. 4C
X & Y MOTION
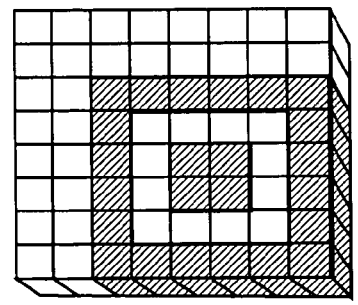
FIG. 4D

MULTIPLE PIXEL MOTION

REFERENCE IMAGE

X ONLY MOTION

Y ONLY MOTION

X & Y MOTION

SUB-IMAGE REGION

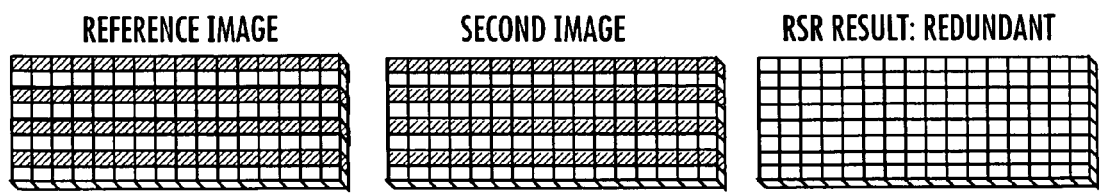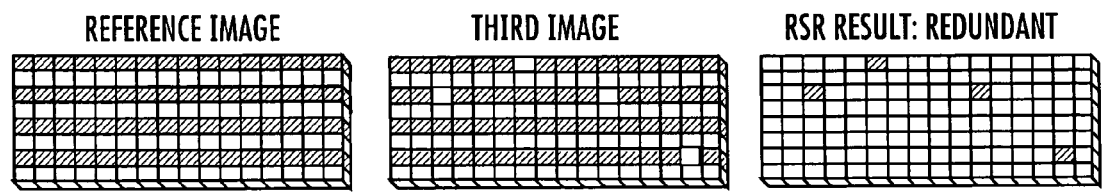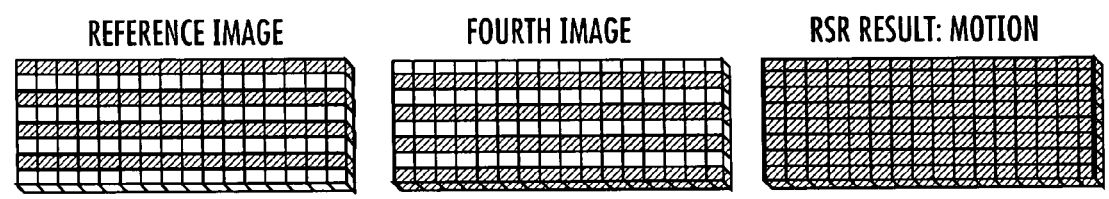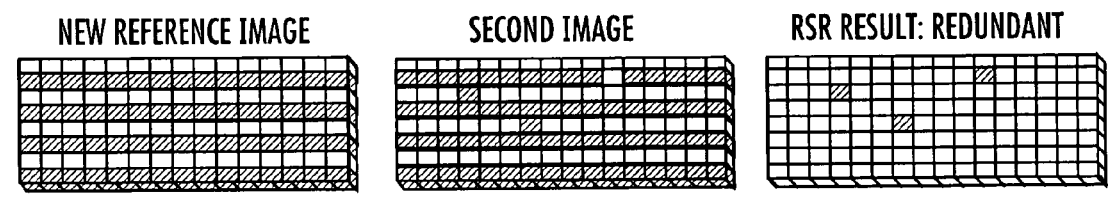

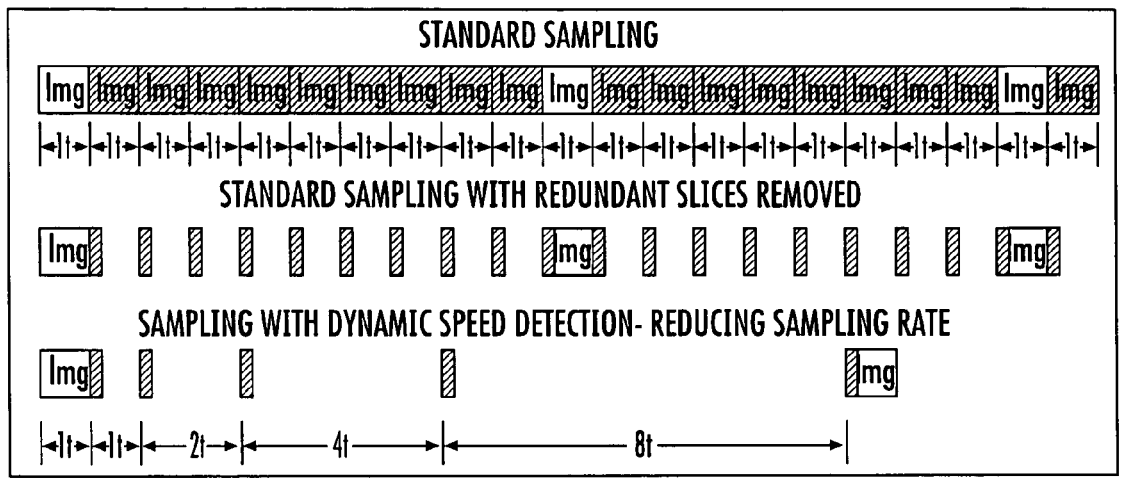
FIG. 11A
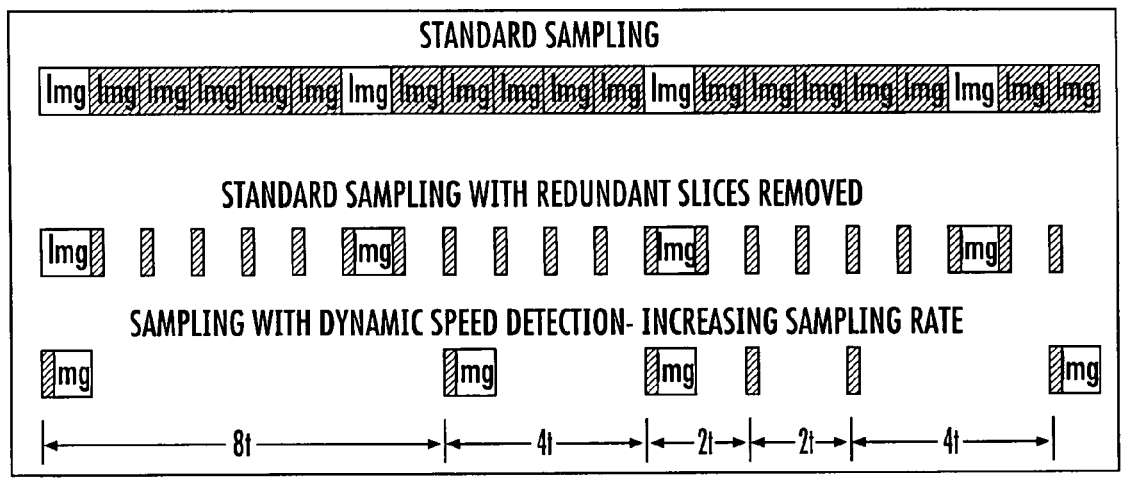
FIG. 11B
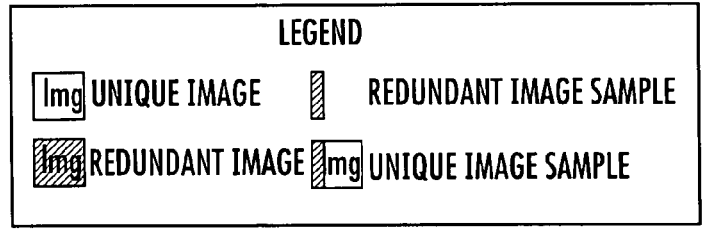

FINGER SENSOR WITH DATA THROTTLING AND ASSOCIATED METHODS

RELATED APPLICATIONS

This application is based upon prior filed copending provisional application Ser. No. 60/618,399 and 60/618,401 both filed Oct. 13, 2004, the entire subject matter of both of which is incorporated herein by reference in its entirety.

FIELD OF THE INVENTION

The invention relates to the field of electronic devices, and, more particularly, to sensors, such as for finger sensing, and electronic devices using such sensors and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak et al. and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use, and they provide reasonable authentication capabilities.

U.S. Published Patent Application No. 2005/0089203 also to Setlak and assigned to the assignee of the present invention discloses an integrated circuit biometric sensor that may sense multiple biometrics of the user, and that is also adapted to either a static placement sensor or a slide finger sensor. A slide finger sensor includes a smaller sensing surface over which the user's finger is slid. The images collected during the sliding process may be collected for matching, such as for authentication, or may be used for navigation, for example.

For example, U.S. Published Application No. 2003/0156744 to Hashimoto also discloses a slide fingerprint sensor system that uses a portion of the sensing array to determine if a finger is present on the sensor. The system also includes a unit connected to the fingerprint sensor for preventing image overlap, and a unit for determining the speed at which a finger is slid over the fingerprint sensor. Similarly, U.S. Published Application No. 2003/0194114 to Mitsuyu et al. discloses a slide fingerprint sensor having a unit connected to the fingerprint sensor for determining the speed at which a finger is slid over the fingerprint sensor.

U.S. Published Application No. 2002/0012455 to Benckert also discloses a slide fingerprint sensor system that can determine the speed at which a finger is slid across the fingerprint sensor. The system further includes a controller connected to the fingerprint sensor for correlating subareas of fingerprint data generated by the fingerprint sensor.

U.S. Published Application No. 2003/0002718 to Hamid discloses a slide fingerprint sensor including a processor for cropping slices of image data into a single image. The processor is connected to a data input/output port for providing communications with a fingerprint correlation system.

U.S. Published Application No. 2003/0123714 to O'Gorman et al. discloses a slide fingerprint sensor system including a processor for removing overlap in fingerprint images generated by the system. The processor may be integrated onto the sensor or alternatively, the processor may be remote from the sensor.

Unfortunately, conventional slide or swipe fingerprint sensors may consume a large amount of power because of the computational demands required by such systems. As biometric access systems become incorporated into a greater number and variety of portable electronic devices, this power demand becomes a problem for the limited battery power sources typically carried by the portable electronic devices.

SUMMARY OF THE INVENTION

In view of the foregoing background, it is therefore an object of the invention to provide a finger sensor and associated method that has enhanced operating efficiency and may reduce power consumption.

This and other objects, features and advantages in accordance with the present invention are provided by a finger sensing device comprising a finger sensing area to receive a user's finger moved in a sliding motion, a sensor controller cooperating with the finger sensing area for collecting image data therefrom, an image processor, and a communications path for sending image data from the sensor controller to the image processor. More particularly, the sensing device may use at least one of the sensor controller and the image processor for performing the following steps: (i) selecting a reference image data subset based upon reference image data, (ii) selecting a new image data subset, and (iii) comparing the new image data subset to the reference image data subset to develop a matching score, and, if the matching score is above a matching threshold, then not having new image data corresponding to the new image data subset sent over the data communications path, and, if the matching score is below the matching threshold, then having the new image data corresponding to the new image data subset sent over the data communications path. In other words, this aspect of the finger sensor relates to data throttling between the sensor controller and the image processor to provide increased computational and communications efficiency, and to also reduce power consumption.

In some embodiments the sensor controller may be operable at different sampling intervals, that is, the sensor controller may be operable with a dynamic scan rate. In other embodiments the sampling interval may be constant. The sampling interval may be increased based upon a first number of successive new image data subsets being above the matching threshold. Conversely, the sampling interval may be decreased based upon a second number of successive new image data subsets being below the matching threshold. This may alternatively or additionally provide data throttling advantages.

In some embodiments, the sensor controller may perform steps (i), (ii), and (iii), while in other embodiments, the image processor performs steps (i), (ii), and (iii). Of course, in yet other embodiments, the steps can be shared between the sensor controller and image processor.

The finger sensing area may comprise an array of sensing pixels. The matching score may be based upon a matching between the reference image data subset and the new image data subset for selected sensing pixels from the array of sensing pixels. For example, the selected sensing pixels may comprise spaced apart sensing pixels, and/or a line from the array of sensing pixels.

At least one of the sensor controller and image processor may also select a new image data subset as the reference image data subset for a next comparing based upon a selected change from a prior reference image data subset. Accordingly, image creep in successive images can be taken into account.

The finger sensing area may comprise an array of electric field sensing pixels, such as formed on an integrated circuit substrate, for example. Of course, the finger sensing device can be incorporated as part of an electronic device where the image processor comprises a host processor that also performs other functions for the electronic device.

Another aspect of the invention is directed to a method for operating a finger sensing device comprising a finger sensing area to receive a user's finger moved in a sliding motion, a sensor controller cooperating with the finger sensing area for collecting image data therefrom, an image processor, and a communications path for sending image data from the sensor controller to the image processor. The method may include using at least one of the sensor controller and the image processor for performing the following steps: (i) selecting a reference image data subset based upon reference image data, (ii) selecting a new image data subset, and (iii) comparing the new image data subset to the reference image data subset to develop a matching score, and, if the matching score is above a matching threshold, then not having new image data corresponding to the new image data subset sent over the data communications path, and, if the matching score is below the matching threshold, then having the new image data corresponding to the new image data subset sent over the data communications path. The method may further or alternatively comprise operating the sensor controller at different sampling intervals. The sensor intelligent throttling techniques may also be used by other image sensing devices.

BRIEF DESCRIPTION OF THE DRAWINGS

FIGS. 3A-3B are exemplary image pixel diagrams as may be used in the finger sensing device of FIGS. 1 and 2.

FIGS. 4A-4D are further exemplary image pixel diagrams as may be used in the finger sensing device of FIGS. 1 and 2.

FIGS. 7A-7C are image pixel comparison diagrams as may be used in the finger sensing device of FIGS. 1 and 2.

FIGS. 8A-8C are further image pixel comparison diagrams as may be used in the finger sensing device of FIGS. 1 and 2.

FIGS. 9A-9C are still further image pixel comparison diagrams as may be used in the finger sensing device of FIGS. 1 and 2.

FIGS. 10A-10C are yet further image pixel comparison diagrams as may be used in the finger sensing device of FIGS. 1 and 2.

FIGS. 11A-11B are exemplary sampling timing diagrams as may be used in the finger sensing device of FIGS. 1 and 2.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
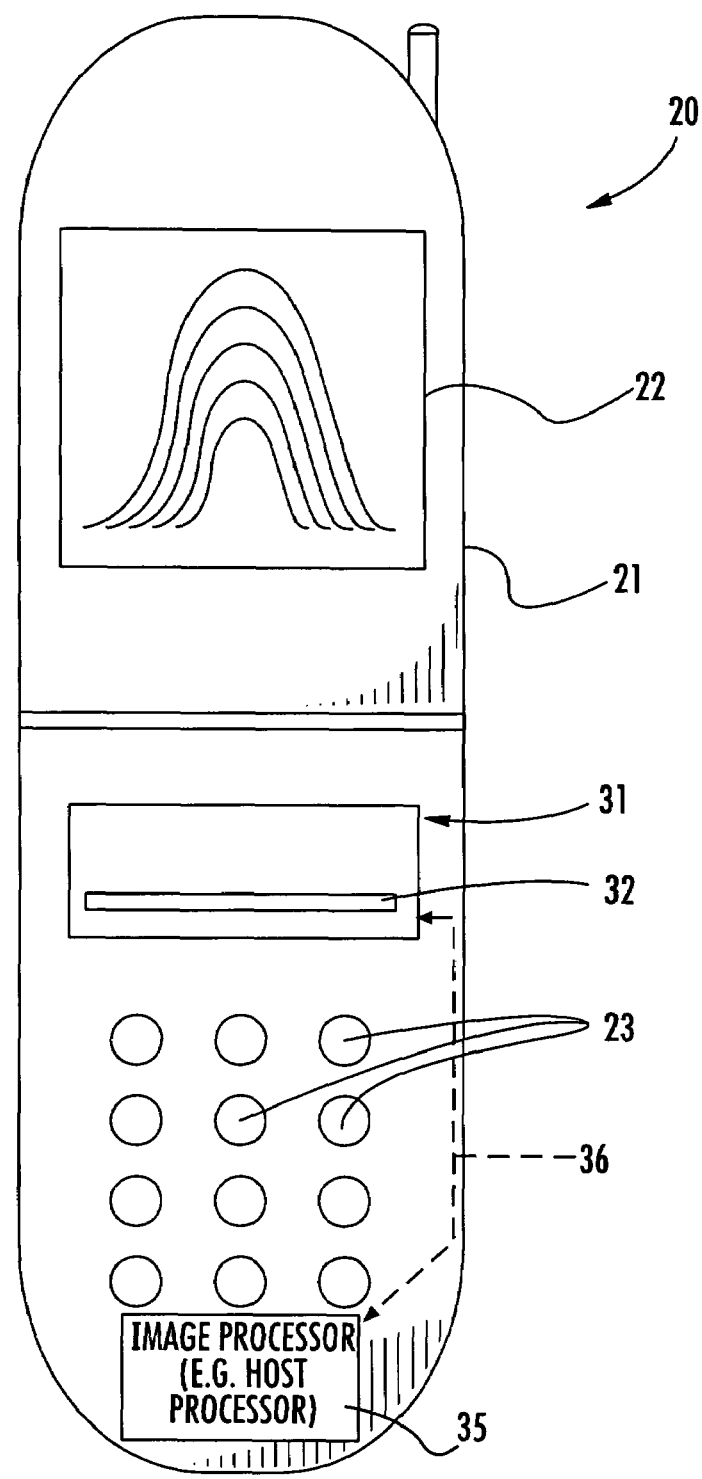
FIG. 1 is schematic front elevational view of an electronic device in the form of a cellular telephone and including a finger sensing device in accordance with the present invention.
Figure 2:
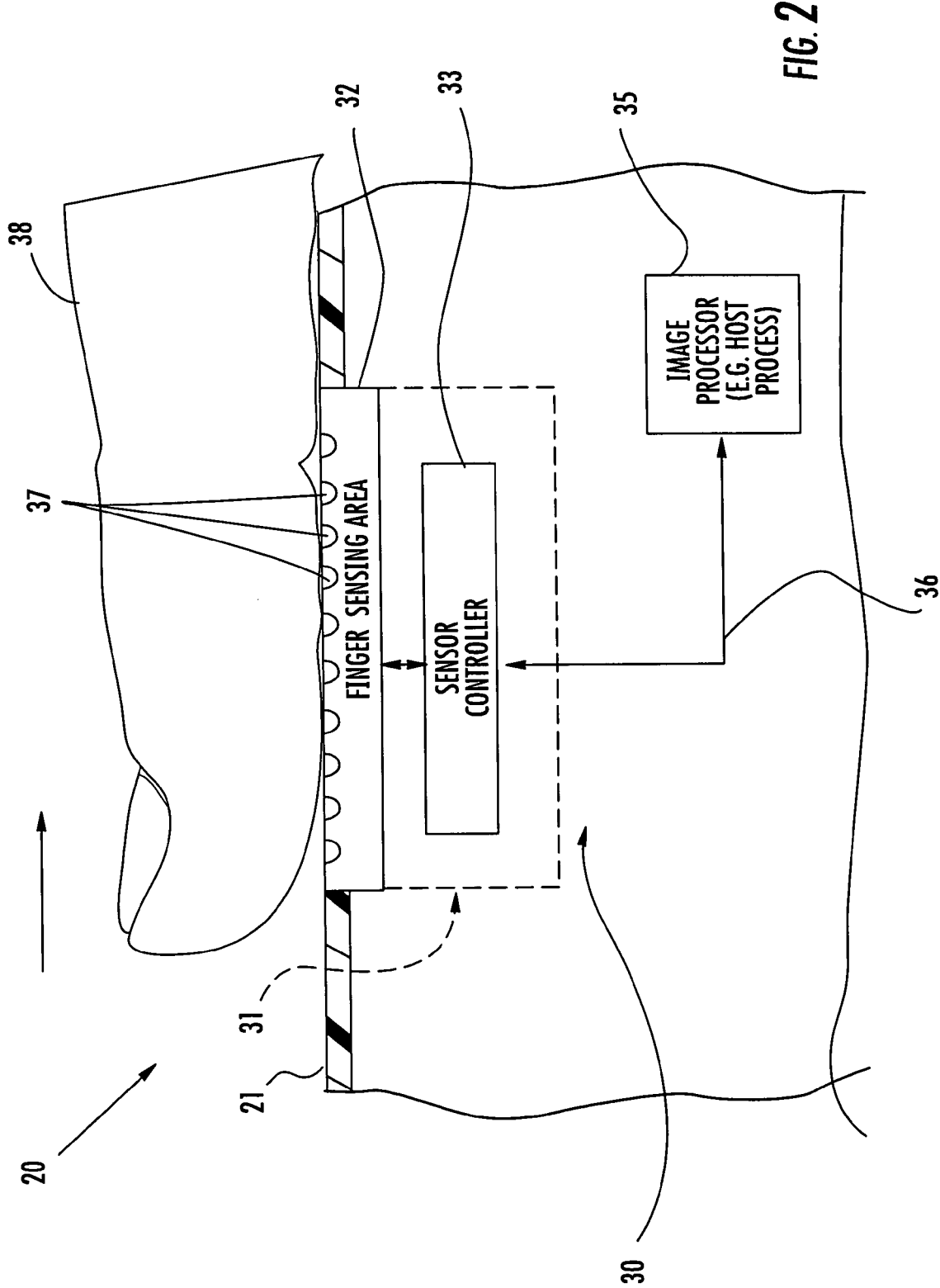
FIG. 2 is more detailed schematic diagram of a portion of the cellular telephone as shown in FIG. 1.
Figure 5A:
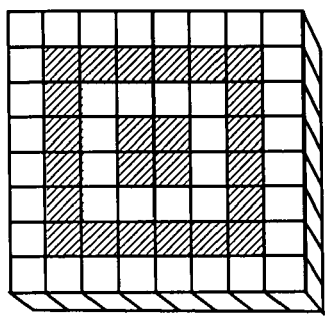
FIGS. 5A-5D are still further exemplary image pixel diagrams as may be used in the finger sensing device of FIGS. 1 and 2.
Figure 5B:
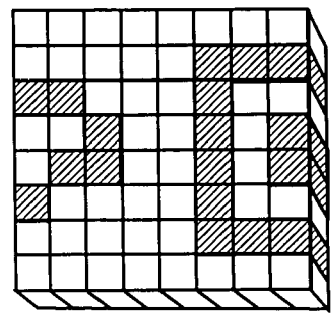
Figure 5C:
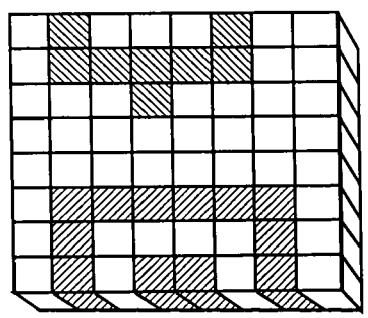
Figure 5D:
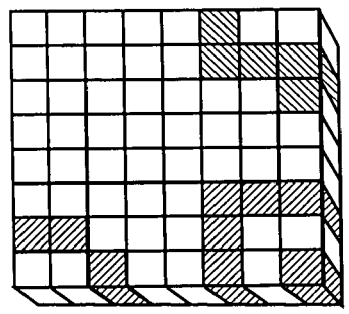

Referring initially to FIGS. 1 and 2 an electronic device in the form of a cellular telephone 20 includes the finger sensing device 30 according to the invention. The cellular telephone 20 is but one example of an electronic device that may benefit from the finger sensing device 30 as will be appreciated by those skilled in the art. The illustrated cellular telephone 20 includes a portable housing 21 that carries a display 22 and a keyboard 23. An integrated circuit finger sensor 31 is carried by the housing 21 and includes a finger sensing area 32 to receive a user's finger 38 (FIG. 2) moved in a sliding motion. The finger sensing area 32 may typically sense the image of ridges and valleys of a fingerprint, or may image other features of the user's finger, such as pores, or even subdermal features, as will be appreciated by those skilled in the art. Of course, other finger sensors could also be used.

The finger sensor 31 illustratively includes a sensor controller 33 cooperating with the finger sensing area 32 for collecting image data therefrom. The finger sensing device 30 also includes an image processor 35, and a communications path 36, such as a serial or parallel data communications bus, for sending image data from the sensor controller to the image processor. In the illustrated embodiment, the image processor 35 is provided by the host processor for the cellular telephone which performs the traditional processing for telephone functions, and that also has additional processing capability available for finger matching, finger navigation, etc. as will be appreciated by those skilled in the art.

The finger sensing device 30 may use at least one of the sensor controller 33 and the image processor 35 for performing the following steps: (i) selecting a reference image data subset based upon reference image data, (ii) selecting a new image data subset, and (iii) comparing the new image data subset to the reference image data subset to develop a matching score, and, if the matching score is above a matching threshold, then not having new image data corresponding to the new image data subset sent over the data communications path 36, and, if the matching score is below the matching threshold, then having the new image data corresponding to the new image data subset sent over the data communications path. In other words, this aspect of the finger sensing device 30 relates to data throttling between the sensor controller 33 of the finger sensor 31 and the image processor 35 to provide increased operating speed and/or efficiency, and to also reduce power consumption.

The sensor controller 33 may be operable at different sampling intervals in some advantageous embodiments. In other embodiments the sampling intervals may be constant. The sampling interval may be increased based upon a first number of successive new image data subsets being above the matching threshold. Conversely, the sampling interval may be decreased based upon a second number of successive new image data subsets being below the matching threshold. This may alternatively or additionally provide data throttling advantages as well as the discarding of redundant image data. This dynamic scan rate or changing sampling interval is further described below.

As will be appreciated by those skilled in the art, the relative complexity and computational functions may be divided between the sensor controller 33 and the image processor 35. For example, in some embodiments, the sensor controller 33 may perform steps (i), (ii), and (iii), while in other embodiments, the image processor 35 performs steps (i), (ii), and (iii). Of course, in yet other embodiments, the steps can be shared between the sensor controller 33 and image processor 35.

The finger sensing area 32 illustratively includes an array of sensing pixels, such as electric field sensing pixels 37 formed on an integrated circuit substrate of the type as described in U.S. Pat. No. 5,963,679 to Setlak et al., assigned to the assignee of the present invention, and the entire contents of which are incorporated herein by reference. Of course, the finger sensing device 30 may be based upon other types of finger sensing as will be appreciated by those skilled in the art.

The matching score may be based upon a matching between the reference image data subset and the new image data subset for selected sensing pixels from the array of sensing pixels. For example, and as will be further discussed below, the selected sensing pixels may comprise spaced apart sensing pixels, and/or a line from the array of sensing pixels.

At least one of the sensor controller 33 and image processor 35 may also select a new image data subset as the reference image data subset for a next comparing based upon a selected change from a prior reference image data subset. Accordingly, image creep in successive images can be taken into account. This advantageous feature is also further described in greater detail below.

Another aspect of the invention is directed to a method for operating a finger sensing device 30 comprising a finger sensing area 32 to receive a user's finger 38 moved in a sliding motion, a sensor controller 33 cooperating with the finger sensing area for collecting image data therefrom, an image processor 35, and a communications path 36 for sending image data from the sensor controller to the image processor. The method may include using at least one of the sensor controller 33 and the image processor 35 for performing the following steps: (i) selecting a reference image data subset based upon reference image data, (ii) selecting a new image data subset, and (iii) comparing the new image data subset to the reference image data subset to develop a matching score, and, if the matching score is above a matching threshold, then not having new image data corresponding to the new image data subset sent over the data communications path 36, and, if the matching score is below the matching threshold, then having the new image data corresponding to the new image data subset sent over the data communications path. The method may further or alternatively comprise operating the sensor controller 33 at different sampling intervals.

Considered in other terms, the finger sensing device 30 compares a small selected subset of two or more sequential images to determine if the image of the object being scanned (sampled) is redundant (nonmoving). The algorithm recognizes that much of the information in a sequence of time sampled images is redundant and not necessary to the task of acquiring a moving target without losing information. By determining image redundancy or matching, the amount of data sent and/or the sampling rate can be dynamically adjusted, which in turn reduces power and data processing requirements. The following discussion will explain how this is accomplished.

Intelligent sensor throttling realizes that redundant image information is obtained when sampling a moving object at a rate faster than is required to detect the movement. If the target is moving slowly enough, there is no significant change between two adjacent images in time. Redundant images can be discarded or not scanned without a loss of information. Redundant images are detected and may be eliminated. Further, realizing that reducing the sampling rate of the data is also desirable, the sampling rate may be dynamically controlled in real-time so that only those images absolutely necessary to track movement are sampled.

The intelligent sensor throttling may be broken down as follows:
1. Acquire reference image;
2. Acquire new image;
3. Select subset;
4. Redundancy checking;
5. Set reference to new subset;
6. Deliver image;
7. Dynamic speed detection; and
8. Image creep adjustment.

An initial image is acquired to be used as the starting reference image. Another image is acquired at a time controlled by the current scan rate to be used to compare against the reference image. This can preferably be a selected subset of the image. The subset of pixels to be compared is selected. This can be a contiguous area or can be a single line or can be a collection of disjoint pixels. The selection can optionally be dynamically adjusted in size, shape and location in the array to better track the object if needed.

In the situation where the direction of movement is known, a subset that is only one pixel high (for example, a line) could be used to determine redundancy without loss of image information allowing detection of motion of more than a single pixel, thus further reducing sampling rate. This is achieved by performing multiple comparisons against the other lines in the image. In the example shown in FIGS. 3A and 3B, a single line of image data is monitored as it moves from the top of the image (FIG. 3A) to the bottom of the image (FIG. 3B). Prior to the line going out of the field of view, a decision can be made to acquire another image and reset the reference point.

Motion in any direction (by as little as a single pixel) can be ascertained with reference to FIGS. 4A-4D. Note that this same principal can be applied in the X direction (FIG. 4B), the Y direction (FIG. 4c), and/or both the X and Y directions (FIG. 4D).

With additional reference to FIGS. 5A-5D, so long as a portion of the original target can be detected in subsequent images, multiple comparisons can be used to reduce the number of samples needed. Images can still be considered redundant so long as there is sufficient overlap to insure no loss of information.

Figure 6:
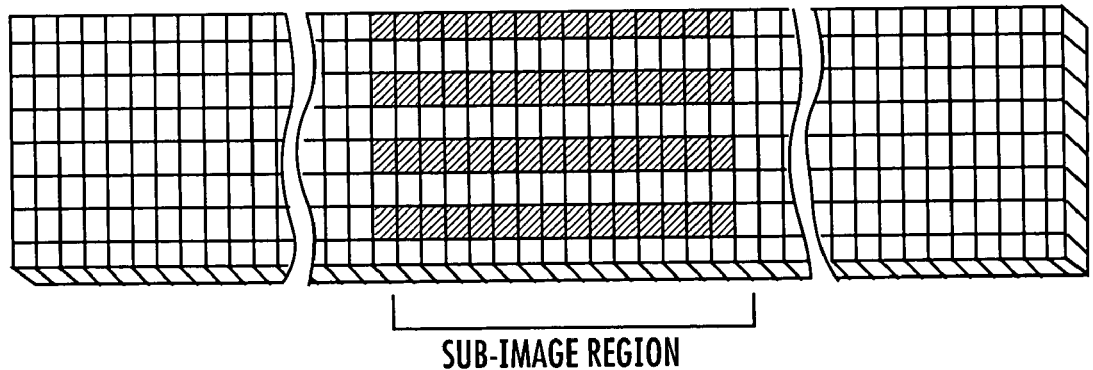
FIG. 6 is another image pixel diagram as may be used in the finger sensing device of FIGS. 1 and 2.

The redundant slice removal (RSR) technique performs a comparison between two sub-images or image data subsets. The sub-images can be a subset contained within the larger image arrays (as shown in FIG. 6, for example) or they can be a sampling of points distributed throughout the image. The key is that the selected subset or points contain some object or objects that have homogeneous non-monolithic information density, such as a fingerprint.

Reference to FIGS. 7A-7C, 8A-8C, 9A-9C and 10A-10C shows comparisons of the two subsets of pixels. It can be a simple bitwise exclusive-or function of binarized data, or it can be a more complicated comparison, such as a grey-scale square of the difference. The comparison between the images produces a matching or redundancy score. The score is proportional to the number of pixels where the images are the same. If the score is higher than a threshold, then the images are deemed to be the same. If the images are the same, then no motion has been detected and the images are redundant. If the score is below a threshold, the images are different, motion is detected, and a new reference image is used for comparison.

Using this approach, a sensor can periodically compare a small sub-image and determine if the subsequent sub-image is redundant. If the sub-image is redundant, it continues to compare sub-images. When a sub-image is not redundant, the full image is transmitted along with an indication of the inter-sample time. Only a selected subset need be scanned. If only the subset is scanned, the sensor power saving is proportional to the ratio of the sub-image size to the total image size. The amount saved by scanning only sub-images can be, for example: (1) if the sub-image is 50% the size of the larger image, then every redundant image detected saves about 50% of the energy required to acquire a full image; and (2) if the sub-image is 10% the size of the larger image, then every redundant image detected saves about 90% of the energy required to acquire a full image.

The new image subset may be copied into a reference image holding buffer in preparation for the next comparison. The whole image may be delivered, and if only the subset was initially scanned it may be necessary to complete the scan, filling in the un-scanned area or a whole new image may be scanned depending on the implementation.

Power consumption is also proportional to the relative speed of the object being scanned by the sensor. The faster the object moves with respect to the sensor, the faster the sensor must scan. The dynamic speed detection (DSD) technique may dynamically adjust the sampling rate by only sampling the images at a rate as dictated by the relative speed between the object being scanned and the sensor. Without DSD, the sensor is typically programmed to scan at a rate that is faster than the object can move. With DSD, the sampling rate is dynamically adjusted as follows: (1) when adjacent image pairs are deemed to be redundant twice in a row, the sampling rate is reduced (for example the rate could be halved), and (2) when adjacent image pairs are deemed to be different twice in a row, the sampling rate is increased (for example the rate could be doubled). When the image pairs are deemed to be different, the full image may be transmitted along with an indication of inter-sample time. Limits placed on the low and high ends of the scan rate may dictate the minimum and maximum detectable speeds per frame respectively as will be appreciated by those skilled in the art. Therefore, for an object moving at a fixed velocity, less than the maximum, the sensor will see movement in one pair and then no movement in the next and so on as will also be appreciated by those skilled in the art.

How the sampling is affected by the RSR and DSD techniques may be understood with additional reference to FIG. 11A (sampling interval increasing) and 11B (sampling speed decreasing). Power savings occur whenever the image is either partially sampled (determined to be redundant), or not sampled at all (in the case of DSD).

For image creep adjustment, it may be desirable to allow the redundancy errors to accumulate (for example in detecting initial object motion). By reloading the reference image with the last acquired image each time, the image is allowed to "creep" along, because the slight image-to-image changes are never allowed to accumulate enough to exceed the threshold. Image creep can be eliminated by reusing the same reference image over and over again (not reloading the reference image buffer each time) and only reloading the reference image buffer when sufficient change is detected.

Figure 12:
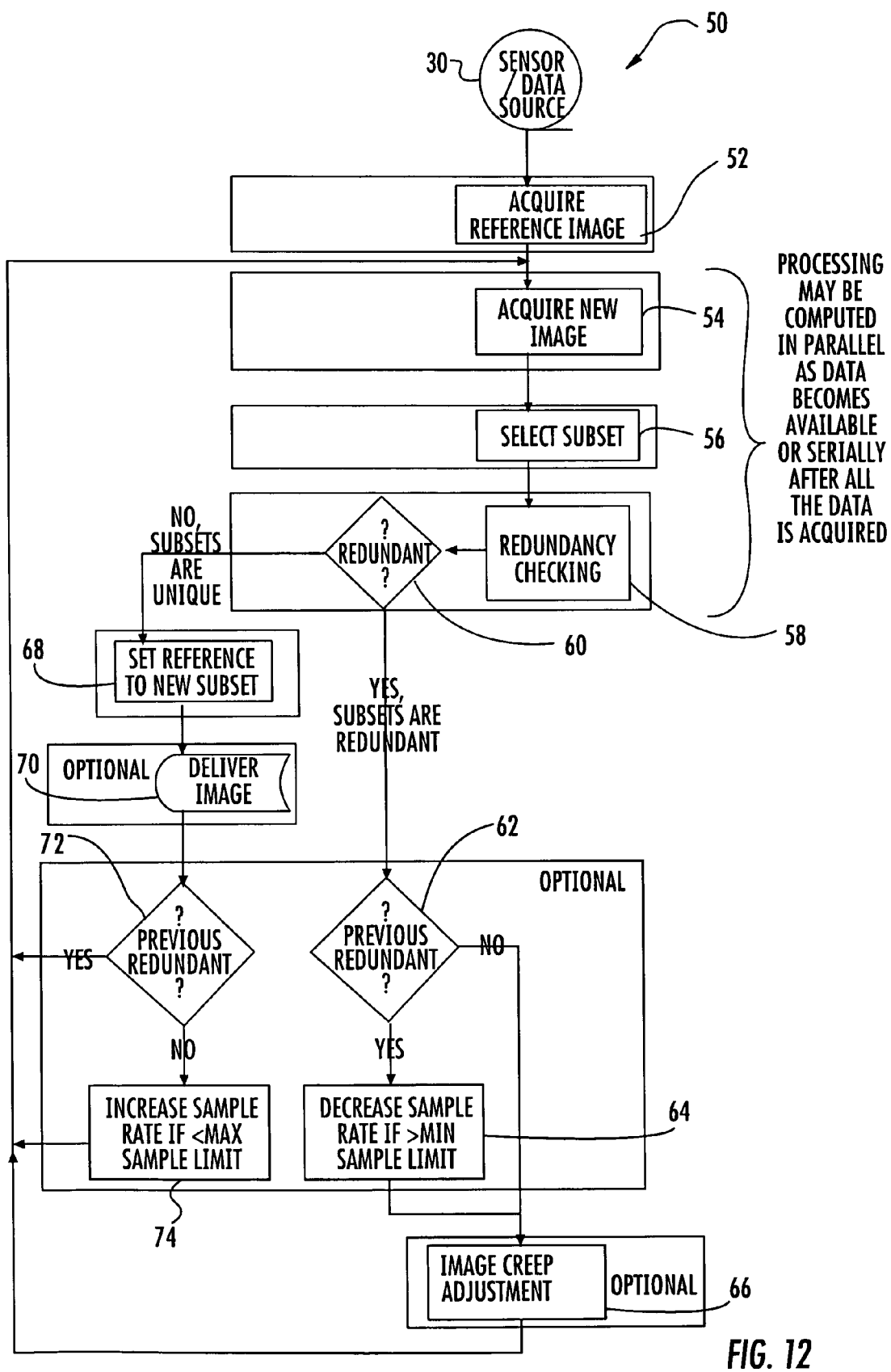
FIG. 12 is a flowchart for a method in accordance with the present invention.

Turning now additionally to the flowchart 50 of FIG. 12, additional method aspects of the finger sensing device 30 are now explained. The finger sensing device 30 collects reference image data at Block 52 and new image data at Block 54. The finger sensing device 30 uses at least one of the sensor controller 33 and the image processor 35 to operate on the reference image data and the new image data. The finger sensing device 30 selects a subset of the new image data based upon the reference image data at Block 56. However, in other embodiments, the new image data is the subset and therefore the selection of the subset would be skipped. The finger sensing device 30 then compares the new image data subset to the reference image data to check for redundancy at Block 58.

The redundancy check determines a matching score and the matching score indicates if the images are redundant or not at Block 60. If the matching score is above a matching threshold, then the new image data corresponding to the new image data subset is not sent over the data communications path 36. Optionally, the finger sensing device 30 may check if the prior new image data subset was also redundant at Block 62, and, if so, it decreases the sample rate at Block 64. In addition, the finger sensing device 30 may adjust for image creep at Block 66.

If the matching score is below the matching threshold, then the new image data corresponding to the new image data subset is sent over the data communications path 36. At this point the finger sensing device 30 sets the new image data as the new reference image data at Block 68 and delivers the reference image at Block 70. Optionally, the finger sensing device 30 checks if the delivered image is redundant to the prior delivered image at Block 72, and, if so, new image data is acquired at Block 54. If the delivered image is not redundant to the prior delivered image, then the finger sensing device 30 may increase the sample rate at Block 74. As would be appreciated by those of skill in the art, the method may end when the finger sensing device 30 successfully accomplishes the task such as authenticating the user.

The finger sensing device 30 and associated methods produce a number of advantages. For example, the prior art typically uses a fixed sampling rate and a large memory buffer for images. The images are sampled until the memory buffer is full. If the object is moving slowly, very little unique information is contained in the buffer. Fast moving objects require faster scan rates. In order to acquire images at a faster rate and maintain sufficient useful information, the sensor must scan at the fastest rate and the memory buffer must grow proportional to this sample rate. Additionally, scanning requires power, so by only scanning at the rate needed to sense the motion, sensor power may be kept to a minimum. Accordingly, the intelligent sensor throttling may provide the following advantages:

1. The entire image need not be scanned or compared to determine if it is redundant.
2. Reduces sensor power by reducing the scanning when redundant (nonmoving) images are present.
3. Reducing the number of images delivered reduces the data bandwidth required to transmit images to an image processor without a loss of meaningful information.
4. With fewer images to process, the image processor CPU utilization, CPU memory, and CPU power consumption are also reduced.
5. The amount of unique information that can be stored in the same memory buffer for slow moving targets is increased (as compared to prior art).

6. The sampling rate can be increased without requiring a corresponding change in the size of the memory buffer. This makes the memory requirements independent of the sample rate and the speed of the object being scanned.
7. Intelligent sensor throttling is practical for both software and hardware implementation.

Other aspects related to the finger sensing devices and methods as described herein are described in copending patent application entitled FINGER SENSING DEVICE FOR NAVIGATION AND RELATED METHODS, filed concurrently herewith and having Ser. No. 11/249,585, the entire disclosure of which is incorporated herein by reference. In addition, the intelligent sensor throttling and other techniques described herein may be adapted to other image sensors, such as CCD sensors, for example, wherein the finger sensing area is replaced by an image sensing area to sense a target moving in relation thereto. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A finger sensing device comprising:
   a finger sensing area to receive a user's finger moved in a sliding motion;
   a sensor controller cooperating with said finger sensing area for collecting image data therefrom;
   an image processor; and
   a communications path for sending image data from said sensor controller to said image processor;
   at least one of said sensor controller and said image processor for performing the following steps
   (i) selecting a reference image data subset based upon reference image data,
   (ii) selecting a new image data subset, and
   (iii) comparing the new image data subset to the reference image data subset to develop a matching score, and, if the matching score is above a matching threshold, then not having new image data corresponding to the new image data subset sent over said data communications path, and, if the matching score is below the matching threshold, then having the new image data corresponding to the new image data subset sent over said data communications path.

2. The finger sensing device according to claim 1 wherein said sensor controller is operable at different sampling intervals.

3. The finger sensing device according to claim 2 wherein the sampling interval is increased based upon a first number of successive new image data subsets being above the matching threshold; and wherein the sampling interval is decreased based upon a second number of successive new image data subsets being below the matching threshold.

4. The finger sensing device according to claim 1 wherein said sensor controller is operable at constant sampling intervals.

5. The finger sensing device according to claim 1 wherein said sensor controller performs steps (i), (ii), and (iii).

6. The finger sensing device according to claim 1 wherein said image processor performs steps (i), (ii), and (iii).

7. The finger sensing device according to claim 1 wherein said finger sensing area comprises an array of sensing pixels; and wherein the matching score is based upon a degree of matching between the reference image data subset and the new image data subset for selected sensing pixels from said array of sensing pixels.

8. The finger sensing device according to claim 7 wherein the selected sensing pixels comprise spaced apart sensing pixels.

9. The finger sensing device according to claim 7 wherein the selected sensing pixels are arranged in at least one line from said array of sensing pixels.

10. The finger sensing device according to claim 1 wherein at least one of said sensor controller and said image processor also selects a new image data subset as the reference image data subset for a next comparing based upon a selected change from a prior reference image data subset.

11. The finger sensing device according to claim 1 wherein said finger sensing area comprises an array of electric field sensing pixels.

12. A finger sensing device comprising:
    a finger sensing area to receive a user's finger moved in a sliding motion;
    a sensor controller cooperating with said finger sensing area for collecting image data therefrom at different sampling intervals;
    an image processor; and
    at least one of said sensor controller and said image processor for performing the following steps
    (i) selecting a reference image data subset based upon reference image data,
    (ii) selecting a new image data subset, and
    (iii) comparing the new image data subset to the reference image data subset to develop a matching score, and, if the matching score is above a matching threshold, then not having new image data corresponding to the new image data subset sent to said image processor, and, if the matching score is below the matching threshold, then having the new image data corresponding to the new image data subset sent to said image processor;
    the sampling interval being increased based upon a first number of successive new image data subsets being above the matching threshold, and the dynamic scan rate being increased based upon a second number of successive new image data subsets being below the matching threshold.

13. The finger sensing device according to claim 12 wherein said sensor controller performs steps (i), (ii), and (iii).

14. The finger sensing device according to claim 12 wherein said image processor performs steps (i), (ii), and (iii).

15. The finger sensing device according to claim 12 wherein said finger sensing area comprises an array of sensing pixels; and wherein the matching score is based upon a degree of matching between the reference image data subset and the new image data subset for selected sensing pixels from said array of sensing pixels.

16. The finger sensing device according to claim 15 wherein the selected sensing pixels comprise spaced apart sensing pixels.

17. The finger sensing device according to claim 15 wherein the selected sensing pixels are arranged in at least one line from said array of sensing pixels.

18. The finger sensing device according to claim 12 wherein at least one of said sensor controller and said image processor also selects a new image data subset as the reference image data subset for a next comparing based upon a selected change from a prior reference image data subset.

19. The finger sensing device according to claim 12 wherein said finger sensing area comprises an array of electric field sensing pixels.

20. An electronic device comprising:
a housing;
a finger sensor carried by said housing and comprising
a finger sensing area to receive a user's finger moved in a sliding motion, and
a sensor controller cooperating with said finger sensing area for collecting image data therefrom;
an image processor carried by said housing; and
a communications path for sending image data from said sensor controller to said image processor;
at least one of said sensor controller and said image processor for performing the following steps
(i) selecting a reference image data subset based upon reference image data,
(ii) selecting a new image data subset, and
(iii) comparing the new image data subset to the reference image data subset to develop a matching score, and, if the matching score is above a matching threshold, then not having new image data corresponding to the new image data subset sent over said data communications path, and, if the matching score is below the matching threshold, then having the new image data corresponding to the new image data subset sent over said data communications path.

21. The electronic device according to claim 20 wherein said image processor comprises a host processor performing additional functions.

22. The electronic device according to claim 20 wherein said sensor controller is operable at different sampling intervals.

23. The electronic device according to claim 22 wherein the sampling interval is increased based upon a first number of successive new image data subsets being above the matching threshold; and wherein the sampling interval is decreased based upon a second number of successive new image data subsets being below the matching threshold.

24. The electronic device according to claim 20 wherein said sensor controller is operable at constant sampling intervals.

25. The electronic device according to claim 20 wherein said sensor controller performs steps (i), (ii), and (iii).

26. The electronic device according to claim 20 wherein said image processor performs steps (i), (ii), and (iii).

27. The electronic device according to claim 20 wherein said finger sensing area comprises an array of sensing pixels; and wherein the matching score is based upon a degree of matching between the reference image data subset and the new image data subset for selected sensing pixels from said array of sensing pixels.

28. The electronic device according to claim 20 wherein at least one of said sensor controller and said image processor also selects a new image data subset as the reference image data subset for a next comparing based upon a selected change from a prior reference image data subset.

29. The electronic device according to claim 20 wherein said finger sensing area comprises an array of electric field sensing pixels.

30. A method for operating a finger sensing device comprising a finger sensing area to receive a user's finger moved in a sliding motion, a sensor controller cooperating with the finger sensing area for collecting image data therefrom, an image processor, and a communications path for sending image data from the sensor controller to the image processor, the method comprising
using at least one of the sensor controller and the image processor for performing the following steps
(i) selecting a reference image data subset based upon reference image data,
(ii) selecting a new image data subset, and
(iii) comparing the new image data subset to the reference image data subset to develop a matching score, and, if the matching score is above a matching threshold, then not having new image data corresponding to the new image data subset sent over the data communications path, and, if the matching score is below the matching threshold, then having the new image data corresponding to the new image data subset sent over the data communications path.

31. The method according to claim 30 further comprising operating the sensor controller at different sampling intervals.

32. The method according to claim 31 wherein the sampling interval is increased based upon a first number of successive new image data subsets being above the matching threshold; and wherein the sampling interval is decreased based upon a second number of successive new image data subsets being below the matching threshold.

33. The method according to claim 30 further comprising operating the sensor controller at constant sampling intervals.

34. The method according to claim 30 wherein the sensor controller performs steps (i), (ii), and (iii).

35. The method according to claim 30 wherein the image processor performs steps (i), (ii), and (iii).

36. The method according to claim 30 wherein the finger sensing area comprises an array of sensing pixels; and wherein the matching score is based upon a degree of matching between the reference image data subset and the new image data subset for selected sensing pixels from the array of sensing pixels.

37. The method according to claim 30 further comprising using at least one of the sensor controller and the image processor to also select a new image data subset as the reference image data subset for a next comparing based upon a selected change from a prior reference image data subset.

38. The method according to claim 30 wherein the finger sensing area comprises an array of electric field sensing pixels.

39. A method for operating a finger sensing device comprising a finger sensing area to receive a user's finger moved in a sliding motion, a sensor controller cooperating with the finger sensing area for collecting image data therefrom at different sampling intervals, an image processor, the method comprising:
using at least one of the sensor controller and the image processor for performing the following steps
(i) selecting a reference image data subset based upon reference image data,
(ii) selecting a new image data subset, and
(iii) comparing the new image data subset to the reference image data subset to develop a matching score, and, if the matching score is above a matching threshold, then not having new image data corresponding to the new image data subset sent to the image processor, and, if the matching score is below the matching threshold, then having the new image data corresponding to the new image data subset sent to the image processor;
increasing the sampling interval based upon a first number of successive new image data subsets being above the matching threshold; and decreasing the sampling interval based upon a second number of successive new image data subsets being below the matching threshold.

40. The method according to claim 39 wherein the sensor controller performs steps (i), (ii), and (iii).

41. The method according to claim 39 wherein the image processor performs steps (i), (ii), and (iii).

42. The method according to claim 39 wherein the finger sensing area comprises an array of sensing pixels; and wherein the matching score is based upon a degree of matching between the reference image data subset and the new image data subset for selected sensing pixels from the array of sensing pixels.

43. The method according to claim 39 further comprising using at least one of the sensor controller and the image processor to also select a new image data subset as the reference image data subset for a next comparing based upon a selected change from a prior reference image data subset.

44. The method according to claim 39 wherein the finger sensing area comprises an array of electric field sensing pixels.

45. An image sensing device comprising:
an image sensing area;
a sensor controller cooperating with said image sensing area for collecting image data therefrom;
an image processor; and
a communications path for sending image data from said sensor controller to said image processor;
at least one of said sensor controller and said image processor for performing the following steps
(i) selecting a reference image data subset based upon reference image data,
(ii) selecting a new image data subset, and
(iii) comparing the new image data subset to the reference image data subset to develop a matching score, and, if the matching score is above a matching threshold, then not having new image data corresponding to the new image data subset sent over said data communications path, and, if the matching score is below the matching threshold, then having the new image data corresponding to the new image data subset sent over said data communications path.

46. The image sensing device according to claim 45 wherein said sensor controller is operable at different sampling intervals.

47. The image sensing device according to claim 46 wherein the sampling interval is increased based upon a first number of successive new image data subsets being above the matching threshold; and wherein the sampling interval is decreased based upon a second number of successive new image data subsets being below the matching threshold.

48. The image sensing device according to claim 45 wherein said sensor controller is operable at constant sampling intervals.

49. The image sensing device according to claim 45 wherein said sensor controller performs steps (i), (ii), and (iii).

50. The image sensing device according to claim 45 wherein said image processor performs steps (i), (ii), and (iii).

51. The image sensing device according to claim 45 wherein said image sensing area comprises an array of sensing pixels; and wherein the matching score is based upon a degree of matching between the reference image data subset and the new image data subset for selected sensing pixels from said array of sensing pixels.

52. The image sensing device according to claim 45 wherein at least one of said sensor controller and said image processor also selects a new image data subset as the reference image data subset for a next comparing based upon a selected change from a prior reference image data subset.

53. The image sensing device according to claim 45 wherein said image sensing area comprises an array of electric field sensing pixels.

* * * * *